(12) United States Patent
Lam et al.

(10) Patent No.: US 9,881,283 B2
(45) Date of Patent: *Jan. 30, 2018

(54) SERVICE DATA RECORD SYSTEM AND POS SYSTEM WITH THE SAME

(71) Applicant: FLYTECH TECHNOLOGY CO., LTD, Taipei (TW)

(72) Inventors: Tai-Seng Lam, Taipei (TW); Hsiao-Hui Lee, New Taipei (TW); Shuei-Jin Tsai, New Taipei (TW)

(73) Assignee: FLYTECH TECHNOLOGY CO., LTD, Taipei (TW)

(*) Notice: Subject to any disclaimer, the term of this patent is extended or adjusted under 35 U.S.C. 154(b) by 236 days.

This patent is subject to a terminal disclaimer.

(21) Appl. No.: 14/593,543

(22) Filed: Jan. 9, 2015

(65) Prior Publication Data

US 2015/0213416 A1 Jul. 30, 2015

(30) Foreign Application Priority Data

Jan. 26, 2014 (CN) ...................... 2014 2 0049436 U
Oct. 9, 2014 (CN) .......................... 2014 1 0529769

(51) Int. Cl.
*G06F 11/00* (2006.01)
*G06Q 10/00* (2012.01)
(Continued)

(52) U.S. Cl.
CPC ......... *G06Q 10/20* (2013.01); *G06F 11/0748* (2013.01); *G06F 11/0778* (2013.01);
(Continued)

(58) Field of Classification Search
CPC .... G06F 1/00; G06F 11/1417; G06F 11/0766; G06F 11/0784; G06F 11/2268; G06F 11/2294; G06F 11/3006; G06F 11/3065; G06F 11/3072; G06F 11/3079; G06F 11/3082; G05B 2219/24048
See application file for complete search history.

(56) References Cited

U.S. PATENT DOCUMENTS 5,124,622 A * 6/1992 Kawamura ........ G05B 19/4063
318/565
5,365,310 A * 11/1994 Jenkins .............. H04N 1/00002
399/8

(Continued)

*Primary Examiner* — Gabriel Chu
(74) *Attorney, Agent, or Firm* — WPAT, PC

(57) ABSTRACT

A service data record system and a POS system with the service data record system are provided. The service data record system transmits a data of an electronic device to a remote monitoring device. The electronic device includes plural electronic units and a power unit. The service data record system includes a power device, a remote monitoring interface and a micro processing unit. The micro processing unit is connected with the electronic device, the remote monitoring interface and the power device. By the micro processing unit, the electronic data set of the electronic unit may be externally transmitted to the remote monitoring device. Moreover, the pre-designate event of the electronic device may be externally transmitted to the remote monitoring device. According to the pre-designate event, it is convenient for a service engineer to make the preparation before repair or maintenance.

8 Claims, 10 Drawing Sheets

(51) Int. Cl.
*G06F 11/07* (2006.01)
*G06F 11/30* (2006.01)
*G07G 1/00* (2006.01)
*G07G 1/12* (2006.01)
*G07F 9/02* (2006.01)
*G06Q 20/20* (2012.01)
*H04L 12/26* (2006.01)

(52) U.S. Cl.
CPC ...... *G06F 11/0784* (2013.01); *G06F 11/3072* (2013.01); *G06Q 20/202* (2013.01); *G07F 9/026* (2013.01); *G07G 1/0018* (2013.01); *G07G 1/12* (2013.01); *H04L 43/065* (2013.01)

(56) References Cited

U.S. PATENT DOCUMENTS

| | | | | |
|---|---|---|---|---|
| 5,367,667 A * | 11/1994 | Wahlquist | ............ | G06F 11/2294 714/31 |
| 5,815,652 A * | 9/1998 | Ote | ............ | G06F 11/0709 709/224 |
| 5,983,364 A * | 11/1999 | Bortcosh | ............ | G06F 11/2257 714/25 |
| 6,477,531 B1 * | 11/2002 | Sullivan | ............ | G06F 17/30873 |
| 6,539,499 B1 * | 3/2003 | Stedman | ............ | G06Q 10/0875 705/29 |
| 6,697,962 B1 * | 2/2004 | McCrory | ............ | G06F 11/0748 714/27 |
| 6,772,376 B1 * | 8/2004 | Merkin | ............ | G06F 11/0748 379/9.04 |
| 7,127,506 B1 * | 10/2006 | Schmidt | ............ | G06F 11/0748 709/224 |
| 7,305,465 B2 * | 12/2007 | Wing | ............ | G06Q 10/06 707/999.01 |
| 7,860,725 B2 * | 12/2010 | Gopinathan | ............ | A61B 5/411 2/159 |
| 8,532,960 B2 * | 9/2013 | Allen | ............ | G06F 11/0781 702/183 |
| 2002/0174380 A1 * | 11/2002 | Mannarsamy | ............ | G06F 11/0748 714/25 |
| 2002/0184118 A1 * | 12/2002 | Gronemeyer | ............ | G06Q 30/06 705/28 |
| 2002/0194550 A1 * | 12/2002 | Lopke | ............ | G06F 11/0748 714/48 |
| 2005/0006468 A1 * | 1/2005 | Fandel | ............ | G06Q 20/20 235/383 |
| 2005/0081111 A1 * | 4/2005 | Morgan | ............ | G06F 11/0748 714/38.14 |
| 2006/0197973 A1 * | 9/2006 | Castellani | ............ | G06K 15/00 358/1.14 |
| 2009/0192815 A1 * | 7/2009 | Canada | ............ | G06F 11/0748 705/1.1 |
| 2012/0078577 A1 * | 3/2012 | Allen | ............ | G06F 11/0781 702/183 |
| 2013/0059578 A1 * | 3/2013 | Finberg | ............ | G06F 11/0748 455/425 |

* cited by examiner

SERVICE DATA RECORD SYSTEM AND POS SYSTEM WITH THE SAME

FIELD OF THE INVENTION

The present invention relates to a service data record system, and more particularly relates to a service data record system for an electronic device and a POS system with the service data record system.

BACKGROUND OF THE INVENTION

A point of sale device, also referred as a point of service device or a POS device, is a widely used electronic device in retail industry nowadays, and is mainly used for managing products and the customer information. Generally, the POS device is usually installed on a cashier desk in a convenience store, a shop or a supermarket for displaying the information and the sum of price of merchandise purchased by consumers. Consequently, it is convenient for a cashier to operate the counting task and avoid errors that may be generated in the checkout process.

Please refer to FIG. 1, which is a schematic perspective view of a conventional POS device. The POS device 1 comprises a screen body 11, a bracket base 12 and a host computer (not shown). The host computer is disposed within the screen body 11, and composed of a mother board, a hard disk, a memory or other components. The host computer is used for executing various calculations and saving the merchandise information (e.g. the amount of merchandise, the price of merchandise, the stock of merchandise, the gross profit or the like). In addition, the cashier can watch the merchandise information which is displayed on the screen.

Furthermore, with ceaselessly change of the consumer demand, the additional functions provided by the POS device 1 are increasing. Consequently, the number of components inside the POS device 1 or the number of peripheral devices of the POS device 1 gradually increases. For example, a magnetic stripe reader device 13 is located at a lateral side of the screen body for charging a card. However, it leads to some difficulties during the repair process. For example, if the POS device is abnormal or unable to be booted while being used, it is hard for a user or a service engineer to readily identify the failed component(s) among the large amount of components. Therefore, the service engineer has no choice but to disassemble the POS device 1 and check components one by one to find out the failed component(s). Actually, it takes much time for trouble shooting.

Furthermore, when the service engineer analyzes the POS device 1, it is hard for the service engineer to accurately find out the reason why the component fails only according to the factory data such as the model type, the specification, the manufactured date, etc. On the contrary, if the service engineer can further get more information about the failed component (e.g. the usage time, the use frequency and the failure rate, etc.), the device engineer can conduct the reliability analysis more effectively.

Hereinafter, some patents relevant to trouble shooting cases will be described. For example, a failure detection device is disclosed in Taiwan Utility Model Patent Number 291039. This failure detection device is installed in an electronic device having a basic input/output system (BIOS). During a hardware inspecting process by the BIOS, associated codes are transmitted to a display module and displayed on the display module. For example, the display module is a seven-segment display or a LED display. Since different codes are relevant to different hardware components, the user or the service engineer can recognize the failed hardware component according to the codes displayed on the display module. However, the failure detection device disclosed in this patent still has some drawbacks as follows.

Firstly, the BIOS is only suitable for detecting the failed hardware component related to the motherboard. Whereas, the breakdown status of the display, the hard disk or the peripheral device and the usage information cannot be obtained through the BIOS. Secondly, if the electronic device is abnormal, the user or the service engineer can only realize which hardware component fails but cannot realize the information about the failed hardware component (e.g. the usage time, the use frequency or the failure rate) through the display module. Under this circumstance, the service engineer cannot effectively repair the failed hardware component, but may only repair the electronic device by replacing the failed hardware component with a new one. Thirdly, if the service engineer who is not near the electronic device cannot initially acquire the breakdown information before repair or maintenance of the electronic device, the service engineer may recognize the failed component after reaching the location of the electronic device. If the service engineer finds that the failed component is not the expected component or the frequently damaged component, the service engineer does not usually carry the maintenance tool or the replacement article. Under this circumstance, since the service engineer has to take many round trips of carrying the maintenance tool or the replacement article, the process of repairing the electronic device is time-consuming.

Furthermore, a computer system as shown in FIG. 2 is disclosed in Chinese Publication Number CN102023917A. In the computer system 2, an embedded controller 202 is connected to plural electronic modules. The electronic modules include a dynamic random access memory (DRAM) module 22, a frequency generator 23, a BIOS 24, an input/output (I/O) control chip 25 and a central processing unit (CPU) 26. While the computer system 2 is booted, the embedded controller 202 may write the collected information S22~S26 of the plural electronic modules into a memory module 200. Consequently, the service engineer may analyze the reason why the computer system 2 has the breakdown by referring to the information in the memory module 200. Moreover, if the embedded controller is separated from the computer system 2 and installed in a monitoring device, the embedded controller may sift out the collected information S22~S26 of the electronic modules in advance, and then write the sifted information S202 into the memory module. Moreover, if the computer system 2 is abnormal, a warning message is generated to warn the user of the computer system 2. For example, a warning window is shown or a warning sound is generated.

However, the computer system 2 disclosed in this patent still has some drawbacks. For example, the user of the computer system 2 and the service engineer can only realize the breakdown status of the computer system according to warning message displayed on the warning window of the computer system 2. For realizing which electronic module fails or realizing the detailed usage information of the failed electronic module, the user or the service engineer has to further read out the contents stored in the memory module 200. If the breakdown of the computer system 2 is very serious, the power unit of the computer system 2 cannot successfully provide electricity, or the computer system 2 crashes and fails to be booted. Under this circumstance, the contents stored in the memory module 200 cannot be read out through the hardware components of the computer system 2. Moreover, since most users (e.g. the users in the terminal side) are usually not capable of removing the memory module 200 from the computer system 2 and reading the contents of the memory module 200 with another reading device, the failure condition cannot be eliminated by the simple troubleshooting procedure. Moreover, the service engineer who is not located beside the computer system 2 cannot clearly realize the possible problem of the computer system 2 through the interpretation of the user. In other words, the service engineer cannot make any preparation before repair or maintenance of the computer system 2.

As mentioned above, the current troubleshooting technology still needs to be improved. Moreover, the data record product for the POS device has not been introduced into the market. Therefore, the above issues should be addressed.

SUMMARY OF THE INVENTION

The present invention provides a service data record system for an electronic device and a POS system with the service data record system. By the service data record system, the pre-designate event of the electronic device (e.g. a POS device) can be externally transmitted to a remote monitoring device. According to the pre-designate event displayed on the display device, it is convenient for a service engineer to make preparation before repair or maintenance of the electronic device.

One objective of this invention is to provide a service data record system for use with an electronic device. The electronic device includes plural electronic units and a power unit for supplying electricity to the electronic device. The service data record system includes a power device, a remote monitoring interface and a micro processing unit. The micro processing unit is electrically connected with the electronic device, the remote monitoring interface and the power device, and receives the electricity from at least one of the power unit and the power device. By the micro processing unit, at least a partial data of an electronic data set of the plural electronic units is externally transmitted to a remote monitoring device. The plural electronic units are modularized as plural electronic modules. The corresponding electronic module of the plural electronic modules is repaired according to the at least partial data received by the remote monitoring device, and/or a process of gathering statistics is performed according to the at least partial data which is received by the remote monitoring device.

In one embodiment, the power device includes at least one selected from a group consisting of a mains power supply, a dry battery, a storage-battery, a lithium battery, a solar battery and a bio battery; and/or the electronic device is a point of sale (POS) device; and/or each of the at least partial data of the electronic data set is a pre-designated event data; and/or a control command from the remote monitoring device is inputted into the service data record system by the micro processing unit; and/or a database is created after the process of gathering statistics.

In one embodiment, the remote monitoring interface includes at least one I/O connection part and/or a network connection part.

In one embodiment, the at least one I/O connection part includes at least one selected from a group consisting of a USB port, a COM port, an inter-integrated circuit (I²C) port, a 3G port, a 4G port, a Bluetooth port and a WiFi port.

In one embodiment, when the electronic device is in a normal working state, the power unit supplies the electricity to the service data record system, wherein when the electronic device is abnormal, the power device supplies the electricity to the service data record system. Alternatively, the electronic device further has a network connection unit. When the electronic device is in the normal working state, the at least partial data of the electronic data set is externally transmitted to the remote monitoring device through the network connection unit, and/or a control command from the remote monitoring device is inputted into the service data record system through the network connection unit. When the electronic device is abnormal, the at least partial data of the electronic data set is externally transmitted to the remote monitoring device through the network connection part, and/or the control command from the remote monitoring device is inputted into the service data record system through the network connection part.

In one embodiment, the plural electronic units include at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least partial data of the electronic data set contains at least one selected from a group consisting of a use frequency of at least one electronic unit of the plural electronic units, a usage time period of the at least one electronic unit, a manufacture data of the at least one electronic unit, a firmware data of the at least one electronic unit, an unusual data of the at least one electronic unit, a repair data of the at least one electronic unit, a power-on data of the electronic device, a power-off data of the electronic device and a sleep data of the electronic device. Alternatively, the plural electronic units include a display, a touch sensor, a mother board, a memory, plural peripheral devices, a hard disk and an adapter. The plural electronic modules include a first electronic module with the display and the touch sensor, a second electronic module with the mother board and the memory, a third electronic module with the plural peripheral devices, a fourth electronic module with the hard disk and a fifth electronic module with the adapter.

In one embodiment, the electronic device further includes a control unit, which is electrically connected with the plural electronic units and receives the electronic data set from the plural electronic units. The service data record system further includes a storage unit. The micro processing unit is electrically connected with the control unit and the storage unit. The control unit sifts out the at least partial data from the electronic data set and transmits the at least partial data to the micro processing unit. The micro processing unit receives the at least partial data of the electronic data set and transmits an entire of the at least partial data to the storage unit and/or the remote monitoring interface. Alternatively, the service data record system further includes a storage unit electrically connected with the control unit, and the electronic data set from the control unit is received by and stored in the storage unit. The micro processing unit is electrically connected with the control unit and the storage unit. The micro processing unit receives and sifts out the electronic data set from the control unit, so that the at least partial data of the electronic data set is transmitted to the remote monitoring interface, and/or the micro processing unit sifts out the electronic data set from the storage unit, so that the at least partial data of the electronic data set is transmitted to the remote monitoring interface. Alternatively, the service data record system further includes a storage unit electrically connected with the control unit. The control unit sifts out the at least partial data from the electronic data set and allows the at least partial data to be transmitted to and stored in the storage unit, and/or the control unit transmits the at least partial data of the electronic data set to the micro processing unit. The micro processing unit receives the at least partial data from the control unit, so that the entire of the at least partial data is transmitted to the remote monitoring interface, and/or the micro processing unit retrieves the at least partial data from the storage unit, so that the entire of the at least partial data of the electronic data set is transmitted to the remote monitoring interface.

In one embodiment, the control unit is an embedded controller; and/or the storage unit is an electrically erasable programmable read-only memory (EEPROM); and/or the micro processing unit allows a power device data of the power device to be transmitted to and stored in the storage unit.

In one embodiment, the service data record system further includes a terminal display which is connecting with the micro processing unit, and the at least partial data of the electronic data set is displayed on the terminal display.

In one embodiment, the terminal display includes at least one selected from a group consisting of a liquid crystal module (LCM), a vacuum fluorescent display (VFD) and a light emitting device (LED) display device; and/or the terminal display is connected with the micro processing unit and/or the storage unit; and/or the micro processing unit allows a terminal display data of the terminal display to be transmitted to and stored in the storage unit; and/or the electronic device further includes a display unit, wherein when the electronic device is in a normal working state, the at least partial data of the electronic data set is displayed on the display unit, wherein when the electronic device is abnormal, the at least partial data of the electronic data set is displayed on the terminal display.

Another objective of this invention is to provide a POS system. The POS system includes a display unit, a host and peripheral device and a service data record system. A merchandise information is displayed on the display unit. The host and peripheral device includes plural electronic units and a power unit. The power unit supplies electricity to the host and peripheral device. The service data record system includes a power device, a remote monitoring interface and a micro processing unit. The micro processing unit is electrically connected with the power device, the remote monitoring interface and the host and peripheral device, and receives the electricity from at least one of the power unit and the power device. By the micro processing unit, at least a partial data of an electronic data set of the plural electronic units is externally transmitted to a remote monitoring device. The plural electronic units are modularized as plural electronic modules. The corresponding electronic module of the plural electronic modules is repaired according to the at least partial data received by the remote monitoring device, and/or a process of gathering statistics is performed according to the at least partial data which is received by the remote monitoring device.

In one embodiment, the power device includes at least one selected from a group consisting of a mains power supply, a dry battery, a storage-battery, a lithium battery, a solar battery and a bio battery; and/or each of the at least partial data of the electronic data set is a pre-designated event data; and/or a control command from the remote monitoring device is inputted into the service data record system by the micro processing unit; and/or a database is created after the process of gathering statistics.

In one embodiment, the remote monitoring interface includes at least one I/O connection part and/or a network connection part.

In one embodiment, the at least one I/O connection part includes at least one selected from a group consisting of a USB port, a COM port, an inter-integrated circuit ($I^2C$) port, a 3G port, a 4G port, a Bluetooth port and a WiFi port.

In one embodiment, when the host and peripheral device is in a normal working state, the power unit supplies the electricity to the service data record system, wherein when the host and peripheral device is abnormal, the power device supplies the electricity to the service data record system. Alternatively, the host and peripheral device further has a network connection unit. When the host and peripheral device is in the normal working state, the at least partial data of the electronic data set is externally transmitted to the remote monitoring device through the network connection unit, and/or a control command from the remote monitoring device is inputted into the service data record system through the network connection unit. When the host and peripheral device is abnormal, the at least partial data of the electronic data set is externally transmitted to the remote monitoring device through the network connection part, and/or the control command from the remote monitoring device is inputted into the service data record system through the network connection part.

In one embodiment, the plural electronic units include at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least partial data of the electronic data set contains at least one selected from a group consisting of a use frequency of at least one electronic unit of the plural electronic units, a usage time period of the at least one electronic unit, a manufacture data of the at least one electronic unit, a firmware data of the at least one electronic unit, an unusual data of the at least one electronic unit, a repair data of the at least one electronic unit, a power-on data of the host and peripheral device, a power-off data of the host and peripheral device and a sleep data of the host and peripheral device. Alternatively, the plural electronic units include a display, a touch sensor, a mother board, a memory, plural peripheral devices, a hard disk and an adapter. The plural electronic modules include a first electronic module with the display and the touch sensor, a second electronic module with the mother board and the memory, a third electronic module with the plural peripheral devices, a fourth electronic module with the hard disk and a fifth electronic module with the adapter.

In one embodiment, the host and peripheral device further includes a control unit, which is electrically connected with the plural electronic units and receives the electronic data set from the plural electronic units. The service data record system further includes a storage unit, wherein the micro processing unit is electrically connected with the control unit and the storage unit. The control unit sifts out the at least partial data from the electronic data set and transmits the at least partial data to the micro processing unit. The micro processing unit receives the at least partial data of the electronic data set and transmits an entire of the at least partial data to the storage unit and/or the remote monitoring interface. Alternatively, the service data record system further includes a storage unit electrically connected with the control unit, and the electronic data set from the control unit is received by and stored in the storage unit. The micro processing unit is electrically connected with the control unit and the storage unit. The micro processing unit receives and sifts out the electronic data set from the control unit, so that the at least partial data of the electronic data set is transmitted to the remote monitoring interface, and/or the micro processing unit sifts out the electronic data set from the storage unit, so that the at least partial data of the electronic data set is transmitted to the remote monitoring interface. Alternatively, the service data record system further includes a storage unit electrically connected with the control unit. The control unit sifts out the at least partial data from the electronic data set and allows the at least partial data to be transmitted to and stored in the storage unit, and/or the control unit transmits the at least partial data of the electronic data set to the micro processing unit. The micro processing unit receives the at least partial data from the control unit, so that the entire of the at least partial data is transmitted to the remote monitoring interface, and/or the micro processing unit retrieves the at least partial data from the storage unit, so that the entire of the at least partial data of the electronic data set is transmitted to the remote monitoring interface.

In one embodiment, the control unit is an embedded controller; and/or the storage unit is an electrically erasable programmable read-only memory (EEPROM); and/or the micro processing unit allows a power device data of the power device to be transmitted to and stored in the storage unit.

In one embodiment, the service data record system further includes a terminal display which is connecting with the micro processing unit, and the at least partial data of the electronic data set is displayed on the terminal display.

In one embodiment, the terminal display includes at least one selected from a group consisting of a liquid crystal module (LCM), a vacuum fluorescent display (VFD) and a light emitting device (LED) display device; and/or the terminal display is connected with the micro processing unit and/or the storage unit; and/or the micro processing unit allows a terminal display data of the terminal display to be transmitted to and stored in the storage unit; and/or the host and peripheral device further includes a display unit. When the host and peripheral device is in a normal working state, the at least partial data of the electronic data set is displayed on the display unit, wherein when the host and peripheral device is abnormal, the at least partial data of the electronic data set is displayed on the terminal display.

DETAILED DESCRIPTION OF THE PREFERRED EMBODIMENT

The present invention provides a service data record system (also referred as a SDR system). The service data record system may be applied to various kinds of electronic devices. The service data record system may be used for displaying various designated event data of the electronic device at the user side (i.e. terminal) in order to allow a user to conduct routine maintenance or allow a service engineer to conduct breakdown maintenance and reliability analysis. The details of the designated event data will be illustrated later. In the following embodiments, a POS device will be illustrated as the example of the electronic device. It is noted that the type of the electronic device may be varied according to practical requirements.

Figure 1:
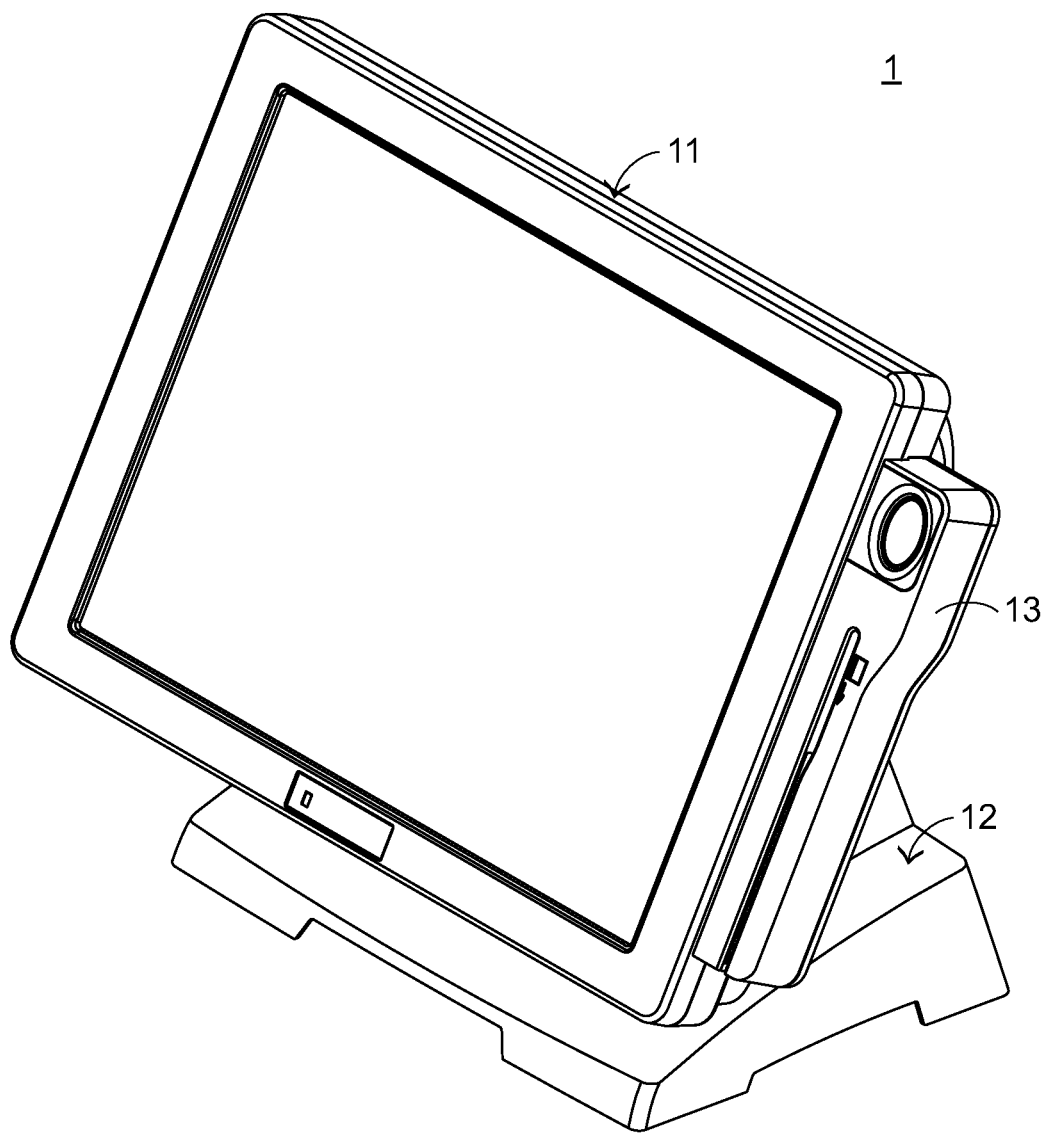
FIG. 1 is a schematic perspective view of a conventional POS device.
Figure 2:
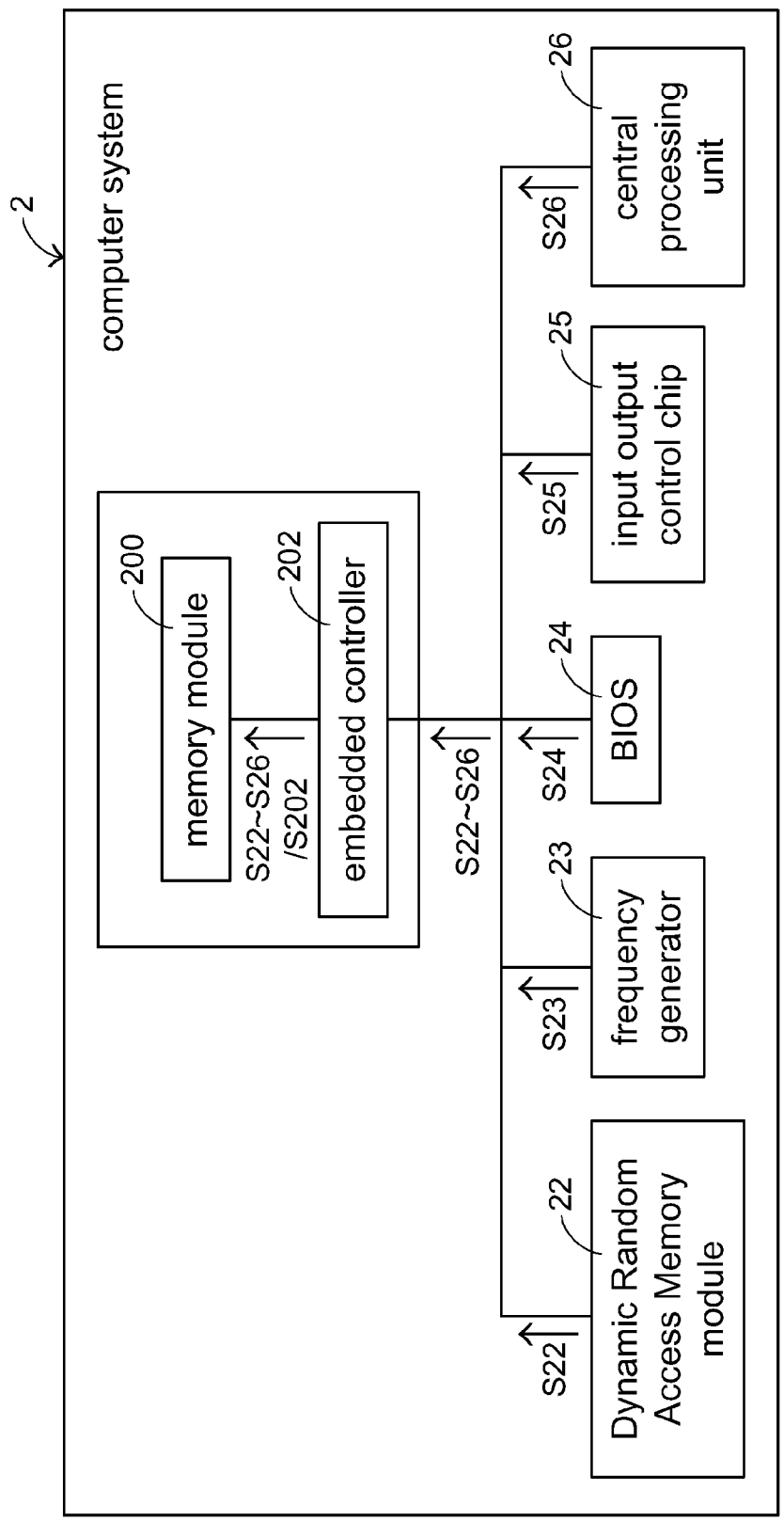
FIG. 2 is a block diagram illustrating a computer system disclosed in Chinese Publication Number 102023917.
Figure 3:
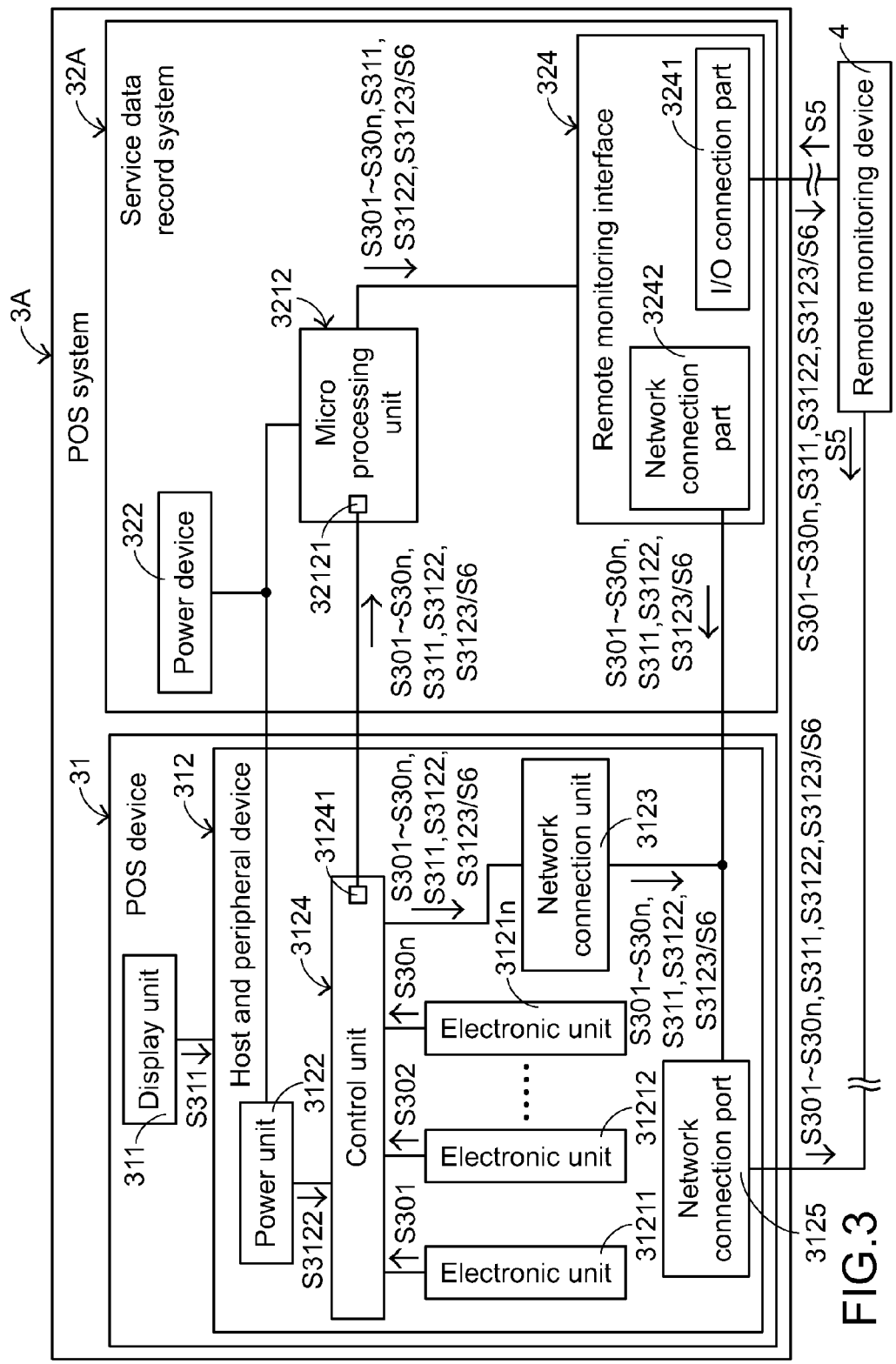
FIG. 3 is a schematic block diagram illustrating a POS system according to a first embodiment of the present invention.

FIG. 3 is a schematic block diagram illustrating a POS system according to a first embodiment of the present invention. As shown in FIG. 3, the POS system 3A comprises a POS device 31 and a service data record system 32A. The POS device 31 comprises a display unit 311 and a host and peripheral device 312. The host and peripheral device 312 comprises plural electronic units 31211~3121$n$, a power unit 3122, a network connection unit 3123 and a control unit 3124. The power unit 3122 is used to supply electricity to the POS device 31 in operation. Moreover, each of the electronic units 31211~3121$n$ provides a specified function. For example, the specified function may be executed to calculate and store the merchandise information such as the quantity, the price, the stock, the gross profit and etc. Moreover, the cashier can watch the merchandise information displayed on the display unit 311.

In this embodiment, these electronic units 31211~3121$n$ include a central processing unit (CPU), a mother board, a function board, a daughter board, a memory (such as a flash memory, a read-only memory, or a random access memory), a display, a hard disk (such as a conventional disk or a solid-state disk), a CD-ROM, an adapter, a scanner, a thermal print device, a USB device, a power supply, a touch sensor, a magnetic stripe reader, a fingerprint recognition device, an information button (iButton), a radio frequency identification device, a card reader and/or an input device (such as a keyboard or a mouse). The functions and the working principles of the above hardware components are familiar to those skilled in the art, so it will not be redundantly described herein. It is noted that the electronic elements 31211~3121$n$ included in the host and the peripheral device 312 are not limited to the above elements.

Furthermore, the control unit 3124 is electrically connected with the power unit 3122, the network connection unit 3123, the display unit 311 and at least one of the electronic units 31211~3121$n$. The control unit 3124 may control the signal timing of each hardware component so as to manage the entire POS device 31. For example, the control unit 3124 is responsible for the keyboard control and the standby and sleep control of the POS device 31. In this embodiment, the control unit 3124 is an embedded controller. Generally, the embedded controller has been widely used in many electronic devices as an important signal processing element. The principles of the embedded controller are well known to those skilled in the art, and are not redundantly described herein.

The service data record system of the present invention will be illustrated as follows. The service data record system 32A comprises a micro processing unit 3212, a remote monitoring interface 324 and a power device 322. The remote monitoring interface 324 is connected with the micro processing unit 3212. The power device 322 is also electrically connected with the micro processing unit 3212. Moreover, the micro processing unit 3212 has a first micro processing unit connection part 32121. The control unit 3124 has a first control connection part 31241. The first micro processing unit connection part 32121 of the micro processing unit 3212 is connected with the first control connection part 31241 of the control unit 3124. Furthermore, in this embodiment, the remote monitoring interface 324 comprises plural I/O connection parts 3241 and a network connection part 3242.

Since the control unit 3124 is electrically connected to the power unit 3122, the network connection unit 3123, the display unit 311 and the electronic units 31211~3121n and is responsible for processing the signal of each hardware component, the control unit 3124 may receive the electronic data sets S301~S30n, S311, S3122 and S3123 from the electronic units 31211~3121n, the display unit 311, the power unit 3122 and the network connection 3123. Moreover, the entire of the electronic data sets S301~S30n, S311, S3122 and S3123 or a partial data S6 of the electronic data sets S301~S30n, S311, S3122 and S3123 may be transmitted from the control unit 3124 to the micro processing unit 3212. Furthermore, the micro processing unit 3212 may transmit the entire of the data S301~S30n, S311, S3122 and S3123/S6 to the remote monitoring interface 324, or select the partial data S6 of the received electronic data sets S301~S30n, S311, S3122 and S3123 and transmit the partial data S6 to the remote monitoring interface 324. Consequent, the at least partial data of the electronic data sets S301~S30n, S311, S3122 and S3123 can be transmitted to a remote monitoring device 4 through the remote monitoring interface 324.

Moreover, an example of the I/O connection part 3241 includes but is not limited to a USB port, a COM port, an inter-integrated circuit (I²C) port, a 3G port, a 4G port, a Bluetooth port or a WiFi port. In this embodiment, the electronic data to be transmitted to the remote monitoring device 4 are relevant to the hardware components which are connected to the control unit 3124. For example, these electronic data contain the use frequency (e.g. the accumulated touch times of a touch sensor), the usage time period (e.g. the accumulated power-on time period of the display unit 311), the manufacture information (e.g. the manufacture date), the firmware information (e.g. the firmware version, the number of times of updating the firmware, and the time point for updating the firmware), the unusual information (e.g. the exception code of the BIOS), and the repair information (e.g. the repair time point and the repair frequency), etc. Alternatively, the pre-designated event data for the POS device 31 may contain the power-on data (e.g. the accumulated power-on time period, the accumulated booting number and the power-on triggering manner), the power-off data (e.g. the accumulated number of shutdown times and the power-off triggering manner) and the sleep data (e.g. the accumulated number of sleep times and sleep-triggering manner). It is noted that the pre-designated event data are not restricted to the above data. The pre-designated event data may be varied by those skilled in the art according to the practical requirements.

Consequently, the service engineer at the remote side can monitor the operating status of the POS device 31 at any time. Moreover, if the POS device 31 is abnormal, the service engineer can make initial recognition and judgment according to the contents received by the remote monitoring device 4 in order to facilitate making the preparation before repair or maintenance. Moreover, according to the contents received by the remote monitoring device 4, the service engineer at the remote side may construct the terminal user how to make repair or maintenance.

The power device 322 is used for providing electricity to the service data record system 32A. An example of the power device 322 includes but is not limited to a mains power supply, a dry battery, a storage battery, a lithium battery, a solar battery or a bio battery. When the POS device 31 is in a normal working state (e.g. in a power-on state), the power unit 3122 of the POS device 31 provides electricity to the entire POS system 3A. Accordingly, the micro processing unit 3212 of the service data record system 32A uses the electricity which is supplied by the power unit 3122. In case the POS device 31 is abnormal, or the POS device 31 may have a crash to result in the power unit 3122 out of work, the power device 322 of the service data record system 32A provides backup electricity to the whole service data record system 32A. Consequently, even if the POS device 31 has an unexpected crash, the at least partial data of the electronic data sets S301~S30n, S311, S3122 and S3123 can be transmitted to a remote monitoring device 4 and also be received by the remote monitoring device 4.

Consequently, regardless of whether the POS device 31 can be booted or not, the service engineer may make the preparation before repair or maintenance or the service engineer at the remote side may construct the terminal user how to make repair or maintenance according to the contents received by the remote monitoring device 4.

Furthermore, the service engineer at the remote side may remotely control the POS system 3A through the remote monitoring interface 324. In other words, a control command S5 from the remote monitoring device 4 may be inputted into the service data record system 32A through the remote monitoring interface 324. For example, the service engineer may set up device parameters through the remote monitoring device 4. Consequently, the control command S5 corresponding to the settings of the device parameters may be inputted into the micro processing unit 3212 through the remote monitoring interface 324. According to the control command S5, the micro processing unit 3212 executes a corresponding control process.

Preferably, the network connection part 3242 of the service data record system 32A and the network connection unit 3123 of the POS device 31 are collaboratively connected to the same network connection port 3125. When the POS device 31 is in a normal working state (e.g. in a power-on state), the at least partial data of the electronic data sets S301~S30n, S311, S3122 and S3123 may be transmitted to the remote monitoring device 4 through the network connection unit 3123 of the POS device 31. Similarly, the control command S5 from the remote monitoring device 4 may be inputted into the POS system 3A through the network connection unit 3123 of the POS device 31.

In case the POS device 31 is abnormal such as the POS device 31 may have a crash, the power unit 3122 does not work or the network connection unit 3123 may have a breakdown, the micro processing unit 3212 may transmit the at least partial data of the received electronic data sets S301~S30n, S311, S3122 and S3123 to the remote monitoring device 4 through the network connection part 3242 of the service data record system 32A, and the control command S5 from the remote monitoring device 4 may be inputted into the POS system 3A through the network connection part 3242 of the service data record system 32A.

Figure 4:
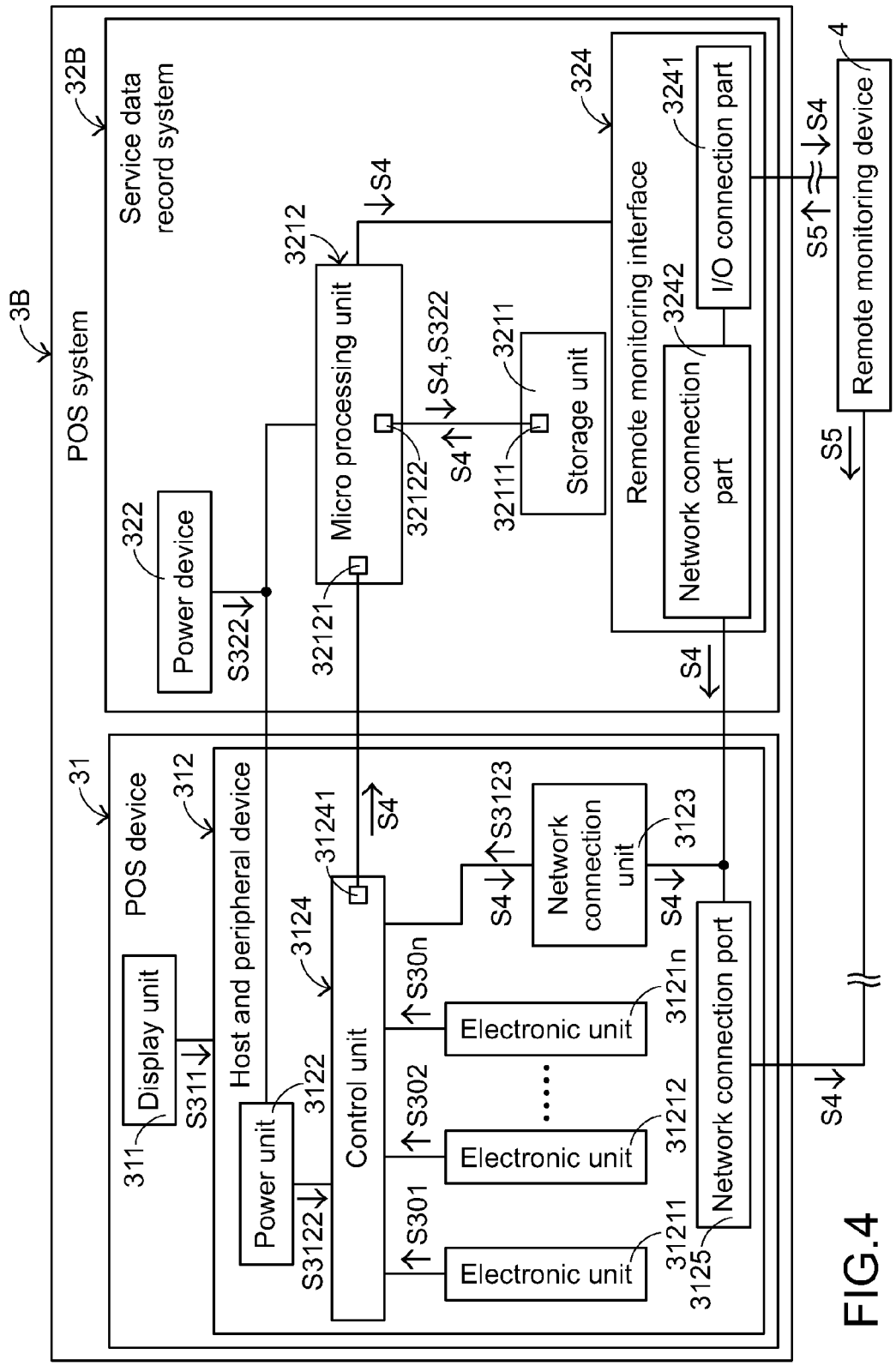
FIG. 4 is a schematic block diagram illustrating a POS system according to a second embodiment of the present invention.

FIG. 4 is a schematic block diagram illustrating a POS system according to a second embodiment of the present invention. The components of the POS system 3B that are similar to those of first embodiment are designated by identical numeral references, and the detailed descriptions thereof are omitted. In comparison with the first embodiment, the service data record system 32B of the POS system 3B of this embodiment further comprises a storage unit 3211. The storage unit 3211 has a first storage connection part 32111. In addition, the micro processing unit 3212 further has a second micro processing unit connection part 32122. The second micro processing unit connection part 32122 of the micro processing unit 3212 is connected to the first storage connection part 32111 of the storage unit 3211. In this embodiment, the storage unit 3211 is, but not limited to be, an electrically erasable programmable read-only memory (EEPROM).

In this embodiment, the control unit 3124 may firstly sift out the desired electronic data S4 from the received electronic data sets S301~S30n, S311, S3122 and S3123. Moreover, the control unit 3124 may sift out the desired electronic data S4 by judging whether the electronic date comply with the pre-designated event data. The micro processing unit 3212 may receive the electronic data S4 which are sifted out by the control unit 3124. Moreover, an entire of the sifted electronic data S4 from the micro processing unit 3212 may be transmitted to and stored in the storage unit 3211, or the entire of the sifted electronic data S4 from the micro processing unit 3212 may be transmitted to the remote monitoring device 4 through the remote monitoring interface 324. Since all of the electronic data S4 received by the micro processing unit 3212 are the pre-designated event data, all of the pre-designated event data may be stored in the storage unit 3211 or transmitted to the remote monitoring device 4 through the remote monitoring interface 324.

Moreover, the electronic data S4 stored in the storage unit 3211 may be retrieved by the micro processing unit 3212 and transmitted to the remote monitoring device 4 through the remote monitoring interface 324. It noted that the present invention is not limited to the above descriptions and embodiments. Those skilled in the art will readily observe that numerous modifications and alterations may be made while retaining the teachings of the invention. For example, in a variant example, the remote monitoring interface may be connected to the storage unit of the service data record system. Consequently, the electronic data stored in the storage unit may be directly received by the remote monitoring device.

In other words, the data flow of each pre-designated event data stored in the storage unit 3211 is started from the corresponding hardware component, then transmitted to the control unit 3124, then transmitted to the micro processing unit 312 through the first control connection part 31241 and the first micro processing unit connection part 32121 sequentially, and finally transmitted to the storage unit 3211 through the second micro processing unit connection part 32122 and the first storage connection part 32111 sequentially.

As mentioned above, the service data record system 32B is equipped with the power device 322. In case the POS device 31 is abnormal, or the POS device 31 may have a crash to result in the power unit 3122 out of work, the power device 322 of the service data record system 32B provides backup electricity to the whole service data record system 32B. Consequently, even if the POS device 31 has an unexpected crash, the pre-designated event data S4 stored in the storage unit 3211 can still be retrieved by the micro processing unit 3212 and transmitted to the remote monitoring device 4 through the remote monitoring interface 324. That is, even if the POS device 31 has a crash, the service engineer at the remote side may conduct associated analysis according to the contents received by the remote monitoring device 4.

When the POS device 31 is in a normal working state (e.g. in a power-on state), the electronic data S4 stored in the storage unit 3211 may be transmitted to the remote monitoring device 4 through the network connection unit 3123 of the POS device 31. In case the POS device 31 is abnormal such as the POS device 31 may have a crash, the power unit 3122 does not work or the network connection unit 3123 may have a breakdown, the electronic data S4 stored in the storage unit 3211 may be transmitted to remote monitoring device 4 through the network connection part 3242 of the service data record system 32B by the micro processing unit 3212.

Moreover, since the micro processing unit 3212 of the service data record system 32B is connected to the power device 322, the micro processing unit 3212 may receive the power device data S322 (e.g. the information about the accumulated use frequency or the dump energy) from the power device 322. Consequently, the power device data S322 may be transmitted to and stored in the storage unit 3211, or transmitted to the remote monitoring device 4 through the remote monitoring interface 324.

Figure 5:
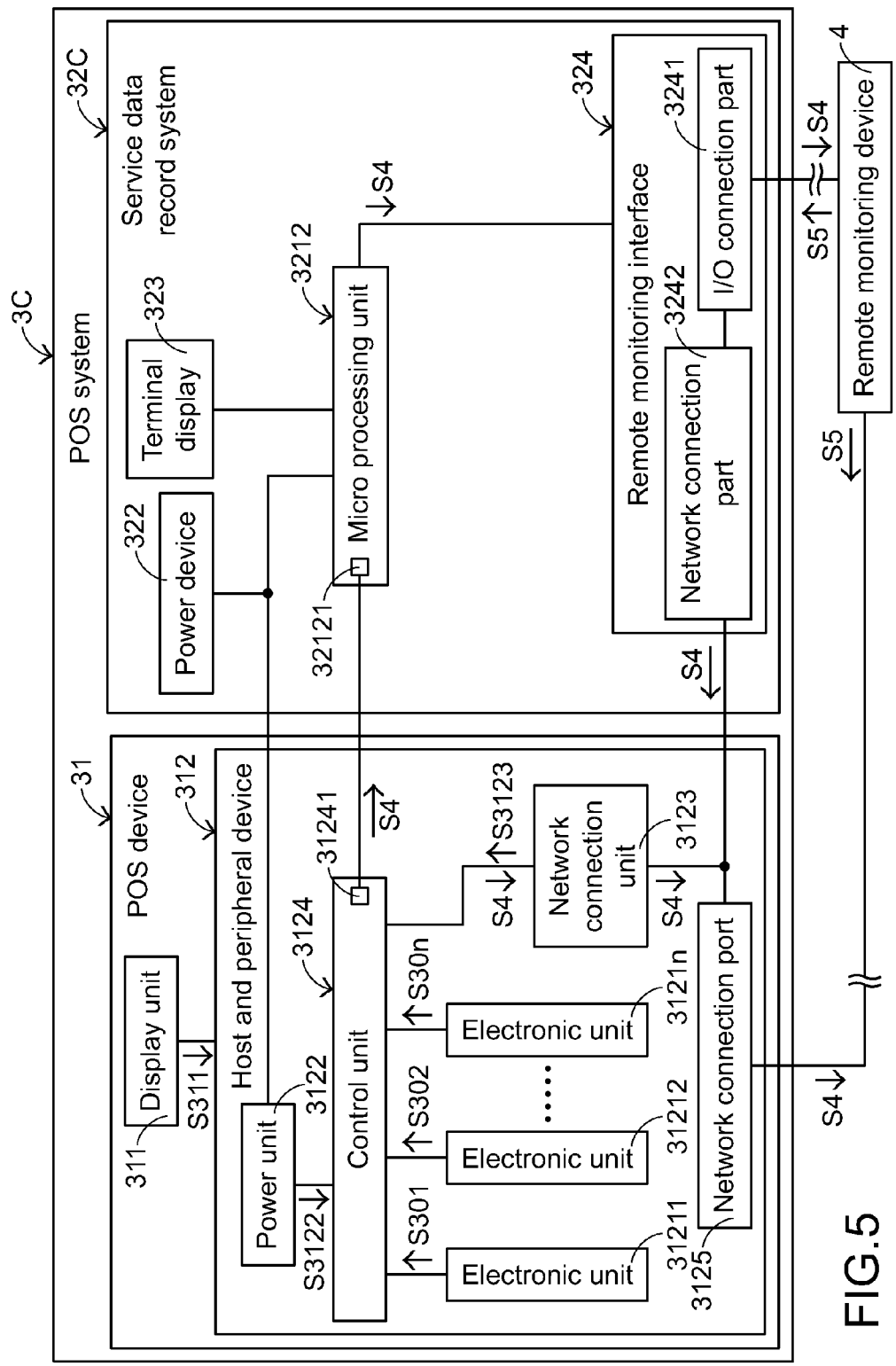
FIG. 5 is a schematic block diagram illustrating a POS system according to a third embodiment of the present invention.

FIG. 5 is a schematic block diagram illustrating a POS system according to a third embodiment of the present invention. The components of the POS system 3C that are similar to those of first embodiment are designated by identical numeral references, and the detailed descriptions thereof are omitted. In comparison with the first embodiment, the service data record system 32C of the POS system 3C of this embodiment further comprises a terminal display 323. The terminal display 323 is connected with the micro processing unit 3212. Consequently, the electronic data S4 received by the micro processing unit 3212 may be displayed on the terminal display 323. An example of the terminal display 323 includes but is not limited to a liquid crystal module (LCM), a vacuum fluorescent display (VFD) or a light emitting device (LED) display device.

In this embodiment, the control unit 3124 may firstly sift out the desired electronic data S4 from the received electronic data sets S301~S30n, S311, S3122 and S3123. Moreover, the control unit 3124 may sift out the desired electronic data S4 by judging whether the electronic date comply with the pre-designated event data. The micro processing unit 3212 may receive the electronic data S4 which are sifted out by the control unit 3124. Moreover, an entire of the sifted electronic data S4 from the micro processing unit 3212 may be transmitted to and displayed on the terminal display 323, or the received electronic data S4 may be transmitted from the micro processing unit 3212 to the remote monitoring device 4 through the remote monitoring interface 324.

Consequently, if the POS device 31 is abnormal, the terminal user (e.g. a cashier) may make simple repair according to the contents displayed on the terminal display 323.

Similarly, the service data record system 32C is equipped with the power device 322. In case the POS device 31 is abnormal, or the POS device 31 may have a crash to result in the power unit 3122 out of work, the power device 322 of the service data record system 32C provides backup electricity to the whole service data record system 32C. Consequently, even if the POS device 31 has an unexpected crash, the pre-designated event data S4 can still be displayed on the terminal display 323.

Figure 6:
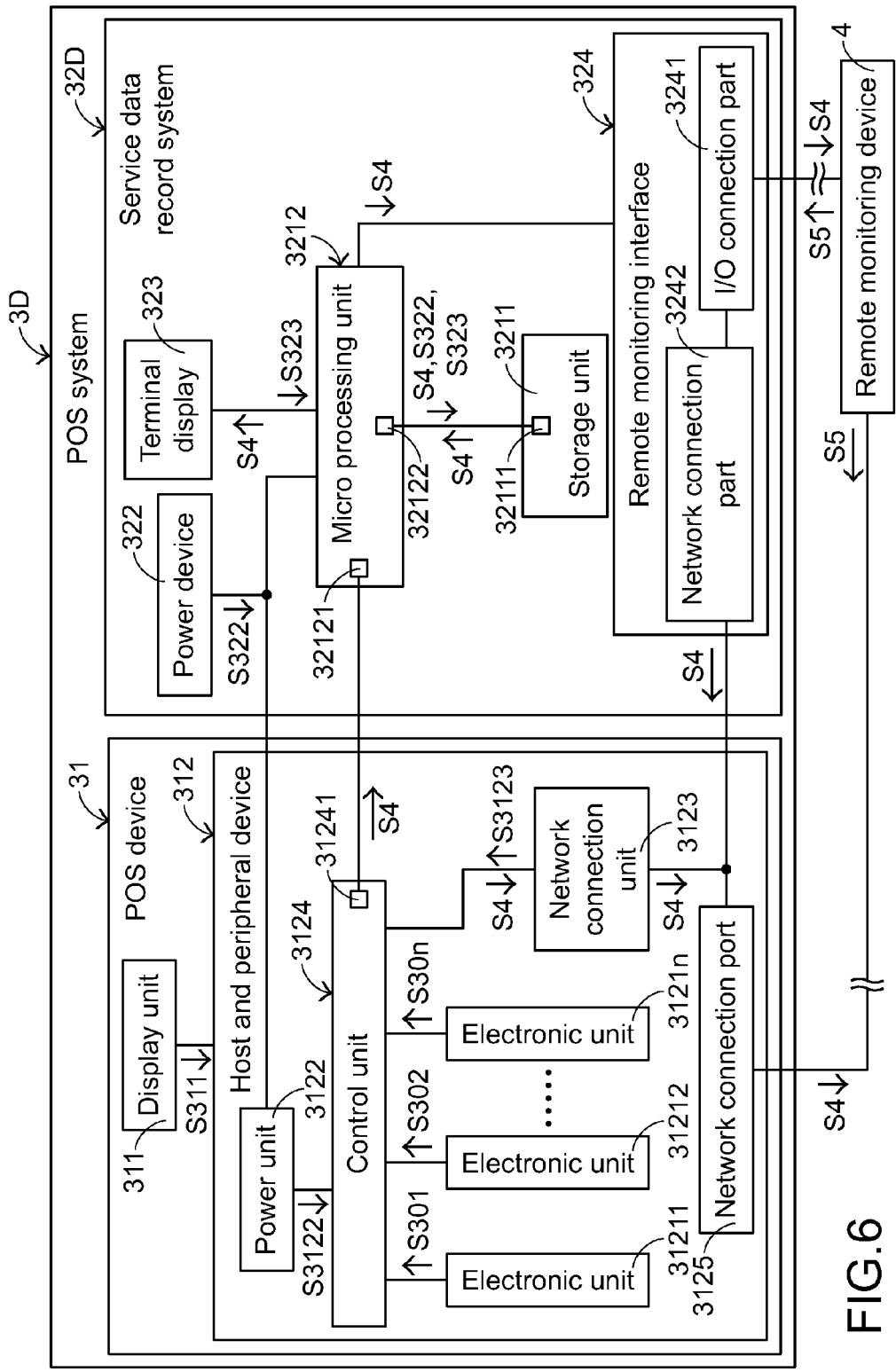
FIG. 6 is a schematic block diagram illustrating a POS system according to a fourth embodiment of the present invention.

FIG. 6 is a schematic block diagram illustrating a POS system according to a fourth embodiment of the present invention. The components of the POS system 3D that are similar to those of second and third embodiment are designated by identical numeral references, and the detailed descriptions thereof are omitted. In comparison with the second and third embodiments, the service data record system 32D of the POS system 3D of this embodiment comprises both of the storage unit 3211 and the terminal display 323.

Moreover, since the terminal display 323 of the service data record system 32D and the storage unit 3211 are both connected to the micro processing unit 3212, the terminal display data S323 (e.g. the information about a use frequency and the accumulated power-on time period of the terminal display 323) from the terminal display 323 may be received by the micro processing unit 3212. Furthermore, the terminal display data S323 may be transmitted to and stored in the storage unit 3211, or transmitted to the remote monitoring device 4 through the remote monitoring interface 324.

Moreover, the micro processing unit 3212 may retrieve the stored electronic data S4 from the storage unit 3211 and allow the electronic data S4 to be transmitted to and displayed on the terminal display 323. It noted that the present invention is not limited to the above descriptions and embodiments. Those skilled in the art will readily observe that numerous modifications and alterations may be made while retaining the teachings of the invention. For example, in a variant example, the terminal display is also connected to the storage unit of the service data record system. Consequently, the electronic data stored in the storage unit may be directly displayed on the terminal display.

Figure 7:
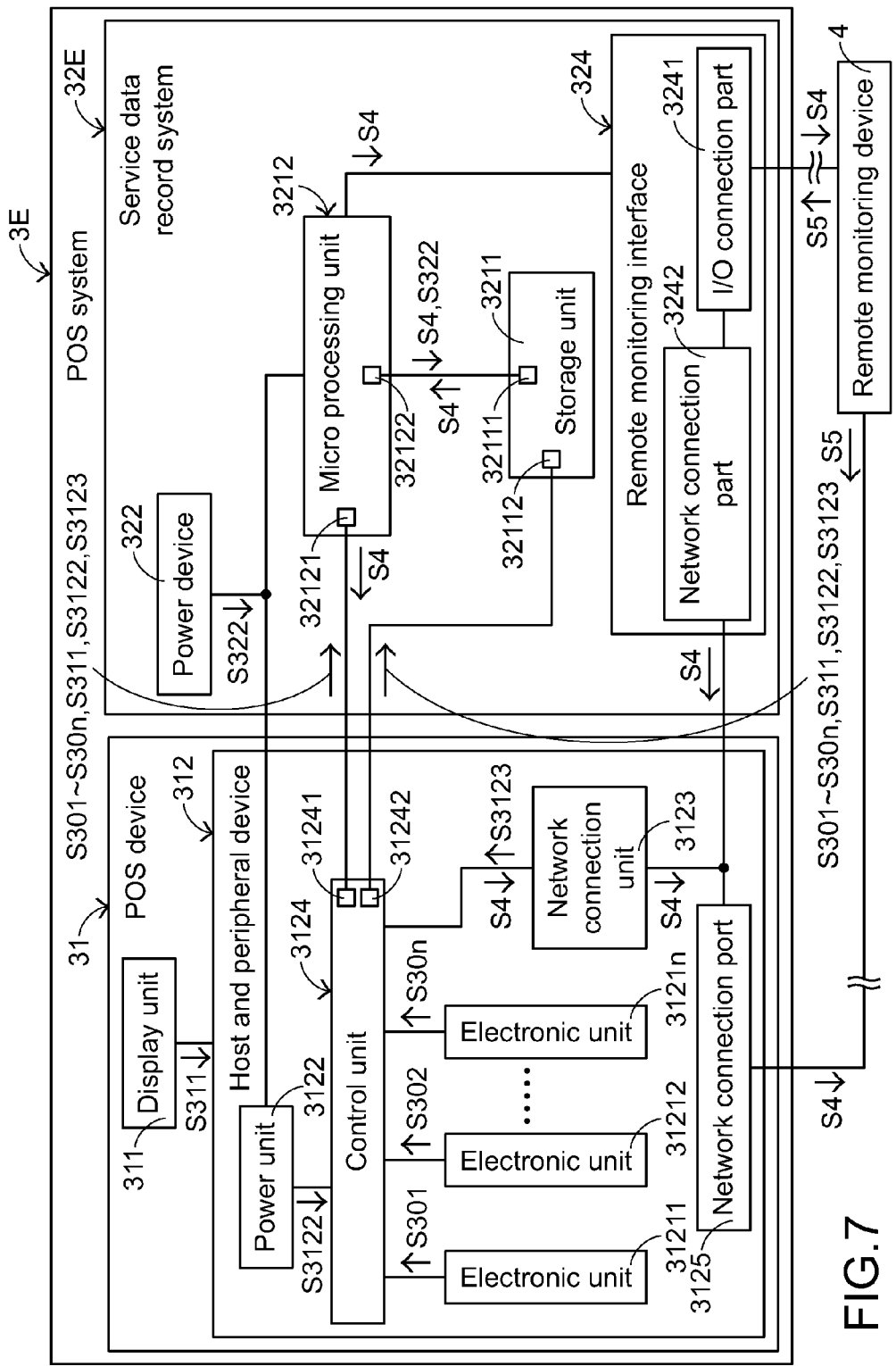
FIG. 7 is a schematic block diagram illustrating a POS system according to a fifth embodiment of the present invention.

FIG. 7 is a schematic block diagram illustrating a POS system according to a fifth embodiment of the present invention. The components of the POS system 3E that are similar to those of second embodiment are designated by identical numeral references, and the detailed descriptions thereof are omitted. In comparison with the second embodiment, the control unit 3124 further has a second control connection part 31242 and the storage unit 3211 further has a second storage connection part 32112. The second storage connection part 32112 is connected to the second control connection part 31242. As mentioned in the second embodiment, the action of sifting out the electronic data sets S301~S30n, S311, S3122 and S3123 is implemented by the control unit 3124 of the POS device 31. Whereas, in this embodiment, the action of sifting out the electronic data sets S301~S30n, S311, S3122 and S3123 is implemented by the micro processing unit 3212 of the service data record system 32E.

In this embodiment, the electronic data sets S301~S30n, S311, S3122 and S3123 received by the control unit 3124 may be directly transmitted to and stored in the storage unit 3211 of the service data record system 32E, or the electronic data sets S301~S30n, S311, S3122 and S3123 received by the control unit 3124 may be transmitted to the micro processing unit 3212. Moreover, the micro processing unit 3212 may receive and sift out the electronic data sets S301~S30n, S311, S3122 and S3123 from the control unit 3124 and allow the partial data S4 of the electronic data sets S301~S30n, S311, S3122 and S3123 to be transmitted to the remote monitoring device 4 through the remote monitoring interface 324; or the partial data S4 of the electronic data sets S301~S30n, S311, S3122 and S3123 may be transmitted to and stored in the storage unit 3211 by the micro processing unit 3212. Moreover, the micro processing unit 3212 may sift out and retrieve the electronic data sets S301~S30n, S311, S3122 and S3123 which are stored in the storage unit 3211, so that the partial data S4 of the electronic data sets S301~S30n, S311, S3122 and S3123 is transmitted to the remote monitoring device 4 through the remote monitoring interface 324. Similarly, the micro processing unit 3212 sifts out the desired electronic data S4 by judging whether the electronic data of the electronic data sets S301~S30n, S311, S3122 and S3123 comply with the pre-designated event data.

As mentioned above, the electronic data sets S301~S30n, S311, S3122 and S3123 from the control unit 3124 are sequentially transmitted through the second control connection part 31242 and the second storage connection part 32112 and stored in the storage unit 3211. Moreover, the micro processing unit 3212 may sift out the pre-designated event data S4 from the electronic data sets S301~S30n, S311, S3122 and S3123 which are stored in the storage unit 3211. Consequently, the pre-designated event data S4 is transmitted to the micro processing unit 3212 through the first storage connection part 32111 and the micro processing unit 3212 sequentially, and the pre-designated event data S4 is further transmitted to the remote monitoring device 4 through the remote monitoring interface 324. Alternatively, the electronic data sets S301~S30n, S311, S3122 and S3123 from the control unit 3124 are transmitted to the micro processing unit 3212 through the first control connection part 31241 and the first micro processing unit connection part 32121 sequentially, and the pre-designated event data S4 is sifted out from the received electronic data sets S301~S30n, S311, S3122 and S3123 by the micro processing unit 3212. Consequently, the pre-designated event data S4 is transmitted to the remote monitoring device 4 through the remote monitoring interface 324.

Figure 8:
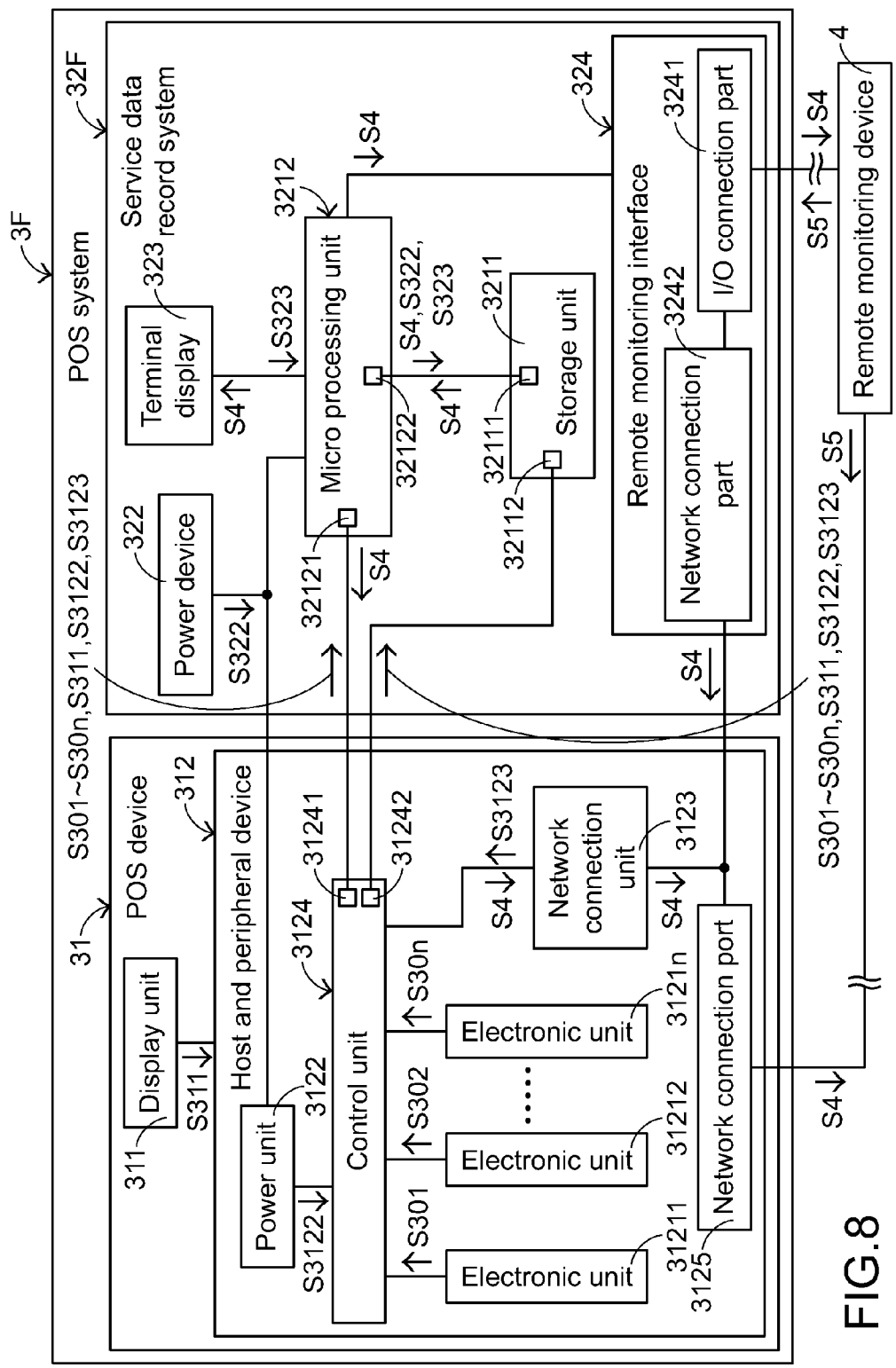
FIG. 8 is a schematic block diagram illustrating a POS system according to a sixth embodiment of the present invention.

FIG. 8 is a schematic block diagram illustrating a POS system according to a sixth embodiment of the present invention. The components of the POS system 3F that are similar to those of fifth embodiment are designated by identical numeral references, and the detailed descriptions thereof are omitted. In comparison with the fifth embodiment, the service data record system 32F of the POS system 3F of this embodiment further comprises a terminal display 323. The terminal display 323 is connected with the micro processing unit 3212. Consequently, the pre-designated event data S4 sifted by the micro processing unit 3212 may be transmitted to and displayed on the terminal display 323. The working principles of the terminal display 323 are similar to those of the third embodiment, and are not redundantly described herein.

Figure 9:
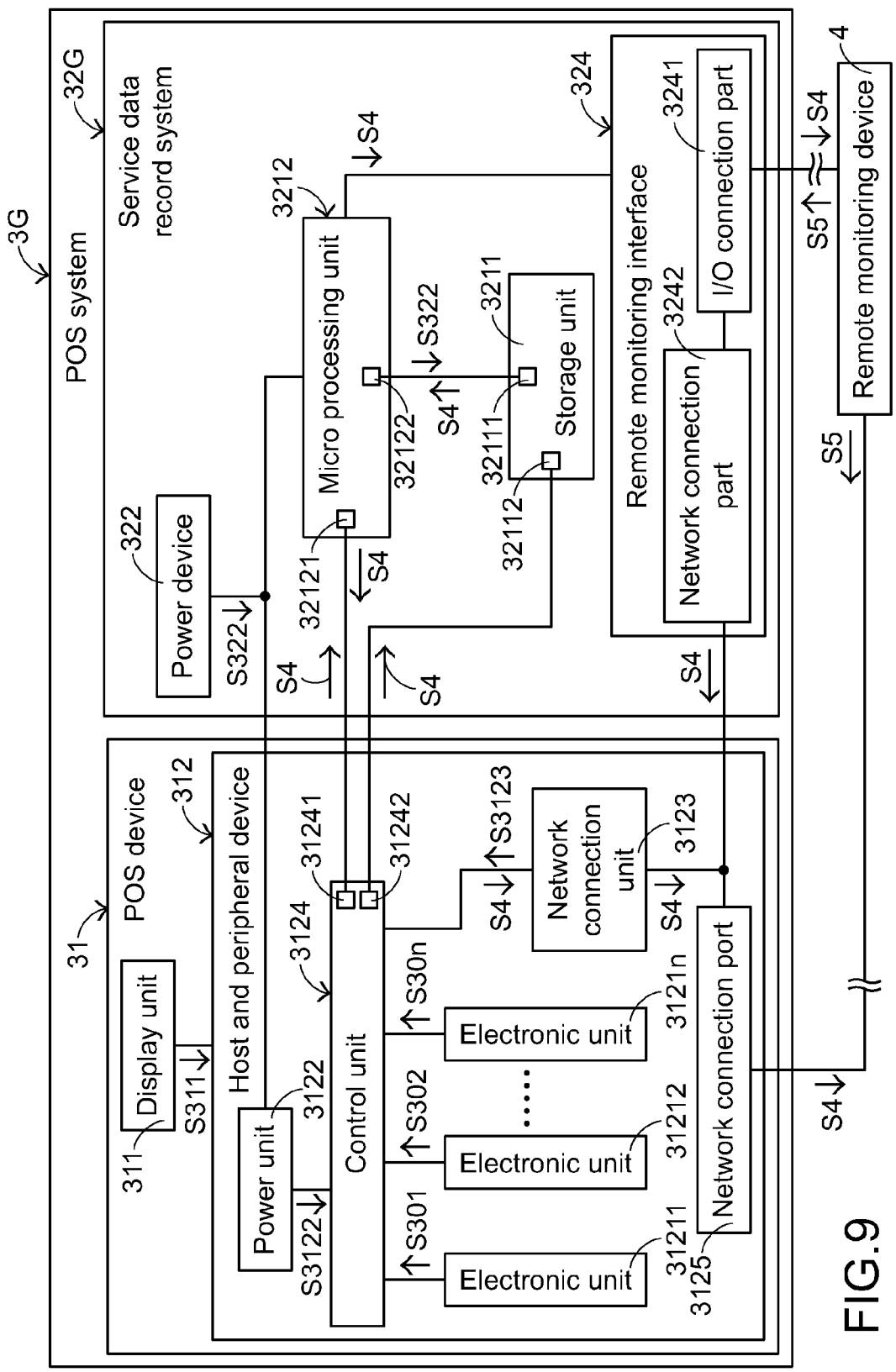
FIG. 9 is a schematic block diagram illustrating a POS system according to a seventh embodiment of the present invention.

FIG. 9 is a schematic block diagram illustrating a POS system according to a seventh embodiment of the present invention. The components of the POS system 3G that are similar to those of fifth embodiment are designated by identical numeral references, and the detailed descriptions thereof are omitted. In comparison with the fifth embodiment, the action of sifting out the electronic data sets S301~S30n, S311, S3122 and S3123 is implemented by the control unit 3124 of the POS device 31. Similarly, the control unit 3124 sifts out the desired electronic data S4 by judging whether the electronic data of the electronic data sets S301~S30n, S311, S3122 and S3123 comply with the pre-designated event data.

In this embodiment, the control unit 3124 may firstly sift out the received electronic data sets S301~S30n, S311, S3122 and S3123, and allow the partial data S4 of the electronic data sets S301~S30n, S311, S3122 and S3123 to be transmitted to and stored in the storage unit 3211 of the service data record system 32G. Moreover, the sifted electronic data may be transmitted from the control unit 3124 to the micro processing unit 3212. The micro processing unit 3212 may receive the electronic data S4 from the control unit 3124 and allow the electronic data S4 to be transmitted to the remote monitoring device 4 through the remote monitoring interface 324. Moreover, the micro processing unit 3212 may retrieve the stored electronic data S4 from the storage unit 3211 and allow the electronic data S4 to be transmitted to the remote monitoring device 4 through the remote monitoring interface 324.

As mentioned above, the sifted electronic data S4 from the control unit 3124 are sequentially transmitted through the second control connection part 31242 and the second storage connection part 32112 and stored in the storage unit 3211. Moreover, by the micro processing unit 3212, the pre-designated event data S4 stored in the storage unit 3211 may be transmitted to the micro processing unit 3212 through the first storage connection part 32111 and the micro processing unit 3212 sequentially. Consequently, the pre-designated event data S4 is further transmitted to the remote monitoring device 4 through the remote monitoring interface 324. Moreover, the sifted electronic data S4 from the control unit 3124 may be transmitted to the micro processing unit 3212 through the first control connection part 31241 and the first micro processing unit connection part 32121 sequentially. By the micro processing unit 3212, the pre-designated event data S4 is transmitted to the remote monitoring device 4 through the remote monitoring interface 324.

Figure 10:
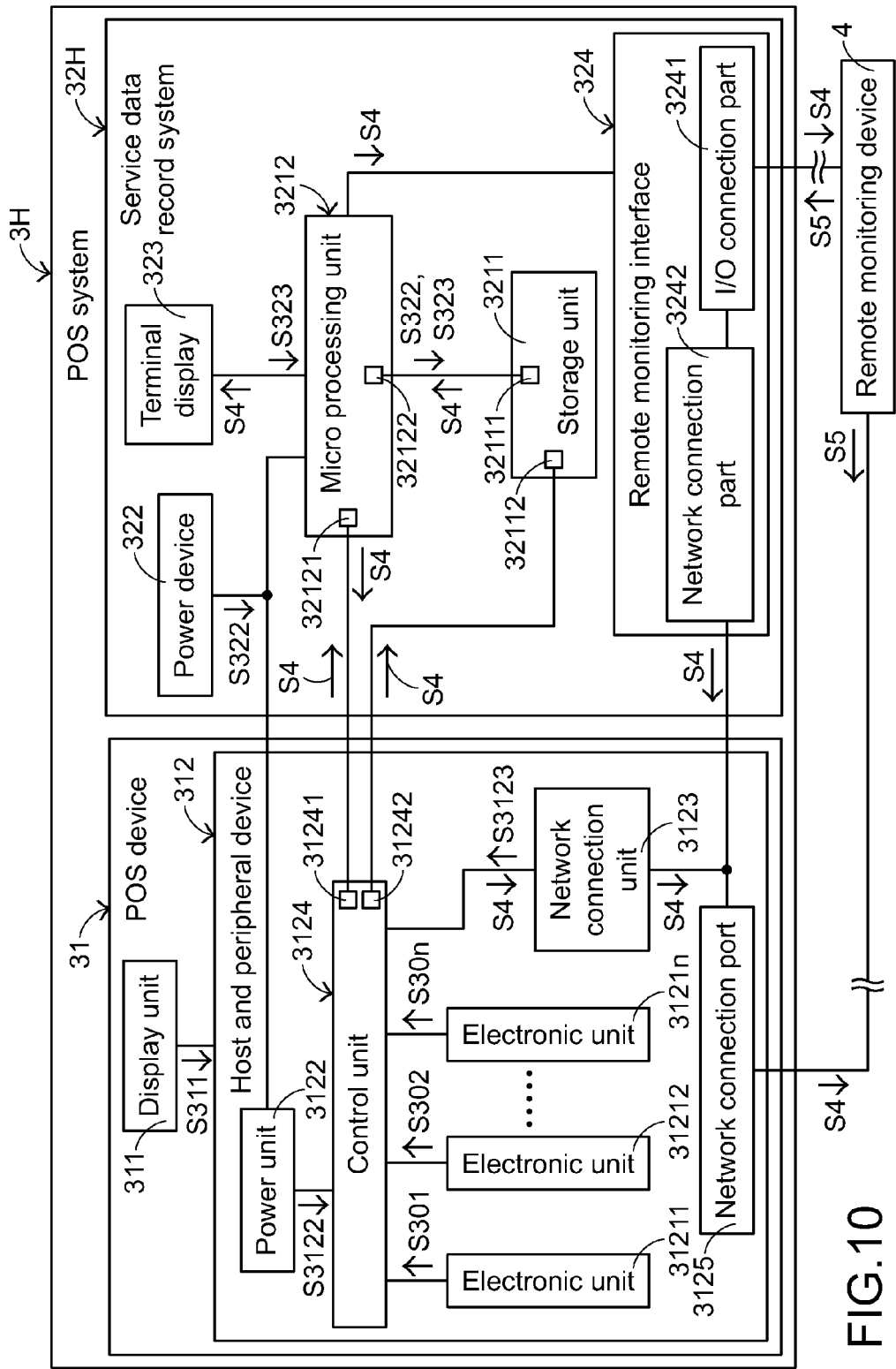
FIG. 10 is a schematic block diagram illustrating a POS system according to an eighth embodiment of the present invention.

FIG. 10 is a schematic block diagram illustrating a POS system according to an eighth embodiment of the present invention. The components of the POS system 3H that are similar to those of seventh embodiment are designated by identical numeral references, and the detailed descriptions thereof are omitted. In comparison with the seventh embodiment, the service data record system 32H of the POS system 3H of this embodiment further comprises a terminal display 323. The terminal display 323 is connected with the micro processing unit 3212. Consequently, the pre-designated event data S4 sifted by the micro processing unit 3212 may be transmitted to and displayed on the terminal display 323. The working principles of the terminal display 323 are similar to those of the third embodiment, and are not redundantly described herein.

In the above embodiments, at least a part of the electronic units may be modularized as replaceable electronic modules. For example, making the at least a part of the removable electronic units in order to simplify the assembling and disassembling procedures may reduce the time and labor cost of the maintenance service. For example, a terminal display and a touch sensor may be modularized as a first electronic module, a mother board and a memory may be modularized as a second electronic module, plural peripheral devices (e.g. a magnetic stripe reader, a fingerprint recognition device, an information button, a radio frequency identification device and a card reader) may be modularized as a third electronic module, a hard disk may be modularized as a fourth electronic module, and an adapter may be modularized as a fifth electronic module. In case the POS device is abnormal, the service engineer at the remote side may recognize the failed electronic module according to the contents received by the remote monitoring device. For repair or maintenance, it is easy to exchange (e.g. replace) the failed electronic module with a new one or a spare one.

Moreover, a data collector of the remote monitoring device may collect the contents received by the remote monitoring device through a process of gathering statistics. After the process of gathering statistics, a database may be created. The database may be used as a service basis for the seller of the POS system. For example, if the seller of the POS system finds that the accumulated touch times of the touch sensor is larger than a predetermined value according to the database, the seller of the POS system may warn the user to change the touch sensor. In addition, the database may be used as a research basis for the researcher of the POS system. For example, if the researcher of the POS system finds that a certain electronic unit is frequently suffered from a breakdown, the researcher may make improvement of the electronic unit in developing the next generation POS system. The uses of the database as the service basis and the research basis are presented herein for purpose of illustration and description only. It is noted that the uses of the database may be varied according to the practical requirements.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A POS system, comprising:
a host and peripheral device comprising plural electronic units and a power unit for supplying electricity to the host and peripheral device, and
a service data record system comprising:
a power device for supplying electricity to the service data record system, the power device being a different device from the power unit;
a remote monitoring interface;
a micro processing unit electrically connected with the host and peripheral device, the remote monitoring interface and the power device; and
a storage unit electrically connected with and controlled by the micro processing unit for storing at least a partial data of an electronic data set generated by and received from the electronic units,
wherein when the host and peripheral device is in a normal working state, the electricity to the service data record system for storing at least the partial data of the electronic data set into the storage unit is supplied by the power unit other than the power device, and when the host and peripheral device has a crash or breakdown, the electricity to the service data record system for the micro processing unit to retrieve from the storage unit and transmit to a remote monitoring device the partial data is the power device instead of the power unit, and wherein the partial data is transmitted to the remote monitoring device through the remote monitoring interface for repairing and/or gathering statistics, and wherein the host and peripheral device further comprises a control unit, which is electrically connected with the plural electronic units, and the control unit receives the electronic data set from the plural electronic units, and transmits the electronic data set to the service data record system to sift out the partial data by the micro processing unit, or sifts and transmits the sifted partial data of the electronic data set to the service data record system to be stored by the storage unit, wherein the control unit is an embedded controller; the storage unit is an electrically erasable programmable read-only memory (EEPROM); and a power device data of the power device is stored in the storage unit.

2. The POS system according to claim 1, wherein a control command from the remote monitoring device is inputted into the service data record system through the remote monitoring interface for the micro processing unit to execute a corresponding control process; and/or a database is created after the process of gathering statistics.

3. The POS system according to claim 1, wherein the remote monitoring interface comprises at least one I/O connection part and/or a network connection part.

4. The POS system according to claim 3, wherein the at least one I/O connection part comprises at least one selected from a group consisting of a USB port, a COM port, an inter-integrated circuit (I²C) port, a 3G port, a 4G port, a Bluetooth port and a WiFi port.

5. The POS system according to claim 3,
wherein the host and peripheral device further has a network connection unit, and the network connection unit and the network connection part of the service data record system are electrically connected to a common network connection port of the host and peripheral device.

6. The POS system according to claim 1,
wherein the plural electronic units comprise at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the partial data of the electronic data set contains at least one selected from a group consisting of a use frequency of at least one electronic unit of the plural electronic units, a usage time period of the at least one electronic unit, a manufacture data of the at least one electronic unit, a firmware data of the at least one electronic unit, an unusual data of the at least one electronic unit, a repair data of the at least one electronic unit, a power-on data of the host and peripheral device, a power-off data of the host and peripheral device and a sleep data of the host and peripheral device; or wherein the plural electronic units comprise a display, a touch sensor, a mother board, a memory, plural peripheral devices, a hard disk and an adapter, wherein the plural electronic modules comprise a first electronic module with the display and the touch sensor, a second electronic module with the mother board and the memory, a third electronic module with the plural peripheral devices, a fourth electronic module with the hard disk and a fifth electronic module with the adapter.

7. The POS system according to claim 1, wherein the service data record system further comprises a terminal display which is connecting with the micro processing unit, and at least the partial data of the electronic data set is displayed on the terminal display.

8. The POS system according to claim 7, wherein the host and peripheral device includes a display unit, which is a different device from the terminal display of the service data record system, and when the host peripheral device has a crash or breakdown, the partial data of the electronic data set is displayed on the terminal display.

* * * * *